United States Patent
Elshaer et al.

(10) Patent No.: US 10,513,185 B2
(45) Date of Patent: Dec. 24, 2019

(54) ELECTRIFIED VEHICLE GROUND FAULT MONITORING SYSTEM

(71) Applicant: Ford Global Technologies, LLC, Dearborn, MI (US)

(72) Inventors: Mohamed Elshaer, Dearborn, MI (US); Allan Roy Gale, Livonia, MI (US); Chingchi Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 15/847,993

(22) Filed: Dec. 20, 2017

(65) Prior Publication Data

US 2019/0184833 A1    Jun. 20, 2019

(51) Int. Cl.
| | | |
|---|---|---|
| *H02J 7/00* | (2006.01) | |
| *B60L 3/00* | (2019.01) | |
| *H02J 7/02* | (2016.01) | |
| *H02J 7/04* | (2006.01) | |
| *H02J 7/06* | (2006.01) | |
| *B60L 53/20* | (2019.01) | |
| *B60L 53/22* | (2019.01) | |

(52) U.S. Cl.
CPC ............ *B60L 3/0069* (2013.01); *B60L 53/20* (2019.02); *B60L 53/22* (2019.02); *H02J 7/022* (2013.01); *H02J 7/045* (2013.01); *H02J 7/06* (2013.01); *B60L 2210/10* (2013.01); *B60L 2210/30* (2013.01); *B60L 2240/80* (2013.01); *B60Y 2200/91* (2013.01); *B60Y 2200/92* (2013.01); *B60Y 2300/91* (2013.01); *H02J 7/0072* (2013.01)

(58) Field of Classification Search
CPC ... Y02T 90/14; Y02T 10/7005; Y02T 90/128; Y02T 10/7088; Y02T 90/163; B60L 3/0069
USPC .......................................................... 320/109
See application file for complete search history.

(56) References Cited

U.S. PATENT DOCUMENTS

| | | | |
|---|---|---|---|
| 5,909,365 A | 6/1999 | Merwin et al. | |
| 8,040,139 B2 | 10/2011 | Plagens et al. | |
| 8,412,973 B1* | 4/2013 | Denton | H04B 3/54 |
| | | | 713/300 |
| 9,274,158 B2 | 3/2016 | Tang et al. | |
| 2013/0038273 A1* | 2/2013 | Riggio | H02J 7/00 |
| | | | 320/107 |

(Continued)

FOREIGN PATENT DOCUMENTS

WO    2015049455 A1    4/2015

OTHER PUBLICATIONS

SAE Intl. Tech Paper—2017-01-1233. "Exploration of the Impact of High Voltage Ground Fault in an Electric Vehicle Connected to Earthing Systems Worldwide", Mar. 28, 2017.

*Primary Examiner* — Arun C Williams
(74) *Attorney, Agent, or Firm* — David Kelley; Brooks Kushman P.C.

(57) ABSTRACT

An electrified vehicle charger includes a diode bridge, contactors, and a controller. The diode bridge may be configured to rectify an alternating current (AC) source. The contactors may couple the AC source with a traction battery. The controller may be configured to, responsive to a magnitude of a potential across a diode of the bridge, corresponding to a neutral crossing of a potential of the AC source, exceeding a threshold, open the contactors.

18 Claims, 10 Drawing Sheets

(56) References Cited

U.S. PATENT DOCUMENTS

| | | | |
|---|---|---|---|
| 2013/0249469 A1* | 9/2013 | Pahlevaninezhad | H02J 7/022 320/107 |
| 2015/0263646 A1* | 9/2015 | Hara | B60L 53/36 363/17 |
| 2016/0190912 A1* | 6/2016 | Lim | G01R 21/006 363/84 |
| 2017/0019966 A1* | 1/2017 | Suehiro | H05B 33/0845 |
| 2017/0174088 A1* | 6/2017 | Muramatsu | B60L 11/182 |
| 2018/0026520 A1* | 1/2018 | Hirota | H02M 1/14 363/21.01 |

* cited by examiner

ELECTRIFIED VEHICLE GROUND FAULT MONITORING SYSTEM

TECHNICAL FIELD

This application is generally related to a monitor system for an electrified vehicle powertrain having an isolated high voltage system that is configured to detect a ground fault.

BACKGROUND

Electrified vehicles (EVs) including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a current. However, improved performance of electric machines may be achieved by operating in a different voltage range, typically at voltages greater than the traction battery terminal voltage. Likewise, the current requirements to drive a vehicular electric machine are commonly referred to as high current. The traction battery is alternatively referred to as a high-voltage battery and the components of the electric-drive (e.g., traction electric machine, inverter, converter, battery, changer, etc.) are referred to components in a high-voltage electrical system, or high-voltage powertrain system. Along with this high-voltage electrical system is a low-voltage electric system which is typically operated at a 12V nominal voltage. The low-voltage electrical system powers many vehicular systems such as radio, navigation systems, vehicle controllers, etc. The low-voltage electric system typically uses conductors for the positive low voltage and the vehicle chassis to carry the negative low voltage, while the high-voltage electric system has dedicated conductors for carrying both positive and negative high voltages.

SUMMARY

An electrified vehicle charger includes a diode bridge, contactors, and a controller. The diode bridge may be configured to rectify an alternating current (AC) source. The contactors may be coupling the AC source with a traction battery. The controller may be configured to, responsive to a magnitude of a potential across a diode of the bridge, corresponding to a neutral crossing of a potential of the AC source, exceeding a threshold, open the contactors.

A method of operating a vehicle charger includes, by a controller and responsive to a potential of an alternating current (AC) source transitioning between a positive and negative voltage, measuring a voltage across a diode of a rectifier for the AC source and responsive to the measurement exceeding a threshold, disabling the charger.

An electrified vehicle charger includes a diode bridge and a controller. The diode bridge may be configured to rectify an alternating current (AC) source, and including a first diode with an anode coupled to a phase terminal of the AC source and a second diode with a cathode coupled to a neutral terminal of the AC source. The controller may be configured to, responsive to the first diode conducting and the second diode not conducting at a zero crossing of the AC source, disable the charger.

DETAILED DESCRIPTION

Figure 1:
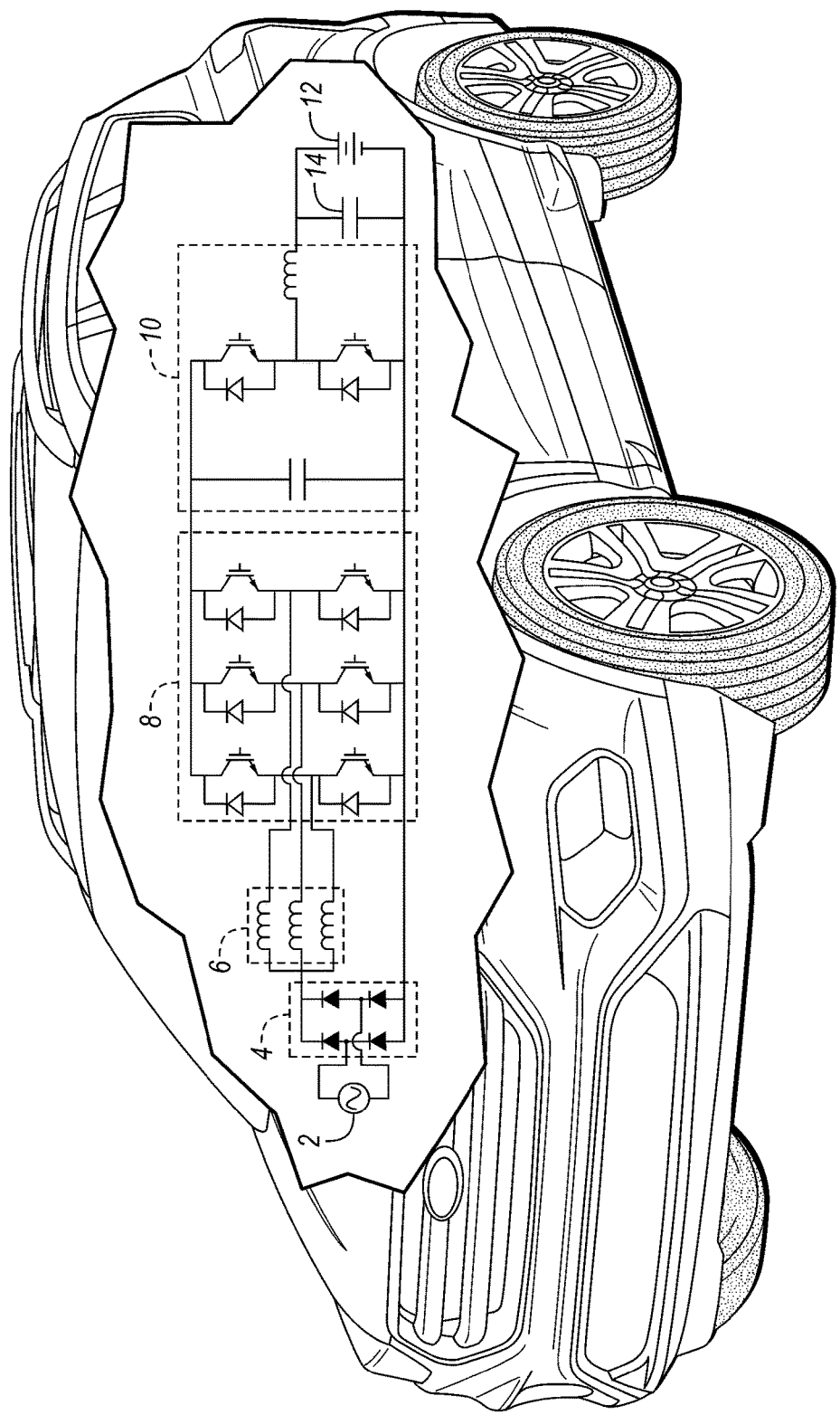
FIG. 1 is a diagram of an electrified vehicle configured as an integrated electric charger.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electrified vehicle typically has both a high-voltage subsystem and a low-voltage system. The high-voltage subsystem may include a traction battery, a DC-DC converter, a DC-AC inverter, and an electric machine. The low-voltage system may include a low-voltage (an accessory battery or 12-volt battery), an engine starter, vehicle accessories such as power seats, power windows, power doors, power locks, and window defrosters, and vehicular control modules and subsystems including anti-lock brakes, airbags, safety systems, adaptive steering, adaptive cruise control, a radiator fan, a distributor, in-vehicle entertainment, telecommunication unit, instrument cluster, vehicle display, and other low-voltage components. In most vehicular implementations, the low-voltage system is not isolated from the chassis in that the chassis serves as a return path for the current. This is accomplished by isolating positive voltages using insulators such as insulated wires and cables while shorting the negative terminal of the battery with the vehicle chassis. This uses the chassis as a return path reducing the need for insulated wires and cables for all negative voltages. However, in most hybrid or electric vehicular implementations, the high-voltage system is electrically isolated in that neither the negative voltage nor the positive voltage are shorted with the chassis. The high-voltage system is configured such that both negative and positive terminals are isolated, typically using both insulated negative cables and insulated positive cables. As such the high-voltage subsystem is referred to as being at a high impedance or ungrounded (floating) with respect to the chassis (or ground). As such the potential of either a negative or positive wire or cable may be substantially greater than or less than the vehicle chassis or ground. To protect against an unwanted discharge, electric/hybrid drive vehicles use an insulation monitor system or ground fault detection system to check and monitor the integrity of the high-voltage (HV) system (including the insulation of the wires, cables, and components).

Here, systems and methods for detecting leakage current to a vehicle chassis or earth ground from a fault between a battery positive terminal and earth ground, via measurements of an input voltage of a non-isolated charger is disclosed. The methods include a volt-second measurement over a small interval at a voltage-in during the AC line zero crossing, an amplitude measurement of the charger at a voltage-in during the AC line zero crossing, and a harmonic content measurement at a voltage-in of the non-isolated charger. Ground fault characteristics are significantly dependent on the earthing system. The state of neutral, supplied by the utility company, in different grounding systems differ from country to country. Moreover, one country could have multiple grounding systems. Each grounding system has a unique implementation. A model describing the theory of the impact of an HV ground fault on a vehicle connected to the TT and TN earthing systems will be disclosed.

FIG. 1 depicts a vehicle with a high-voltage system and high-voltage charger system. Here an alternating current (AC) source 2 is rectified by a bridge rectifier 4 to convert the AC power to direct current (DC) power. The DC power then flows through the windings of the motor via a neutral terminal of a "Y-wound" electric machine 6. After passing through the phase windings of the electric machine 6, power passes through a DC/AC inverter 8. After which the power passes through a DC/DC converter 10 (e.g., a buck/boost converter) that is then filtered via a storage capacitor 14, and stored in the battery 12. In this system, both the positive and negative terminals and buses are isolated such that the high-voltage bus is floating with respect to a vehicle chassis potential or a ground potential. The integrated charger structure of FIG. 1 offers a solution to utilize the existing hardware in the vehicle effectively. Since the charging and driving operations do not occur at the same time, using the same hardware to do both functionalities is an elegant solution to reduce the cost of the electric vehicle. Furthermore, system efficiency and size can be further reduced.

Figure 2:
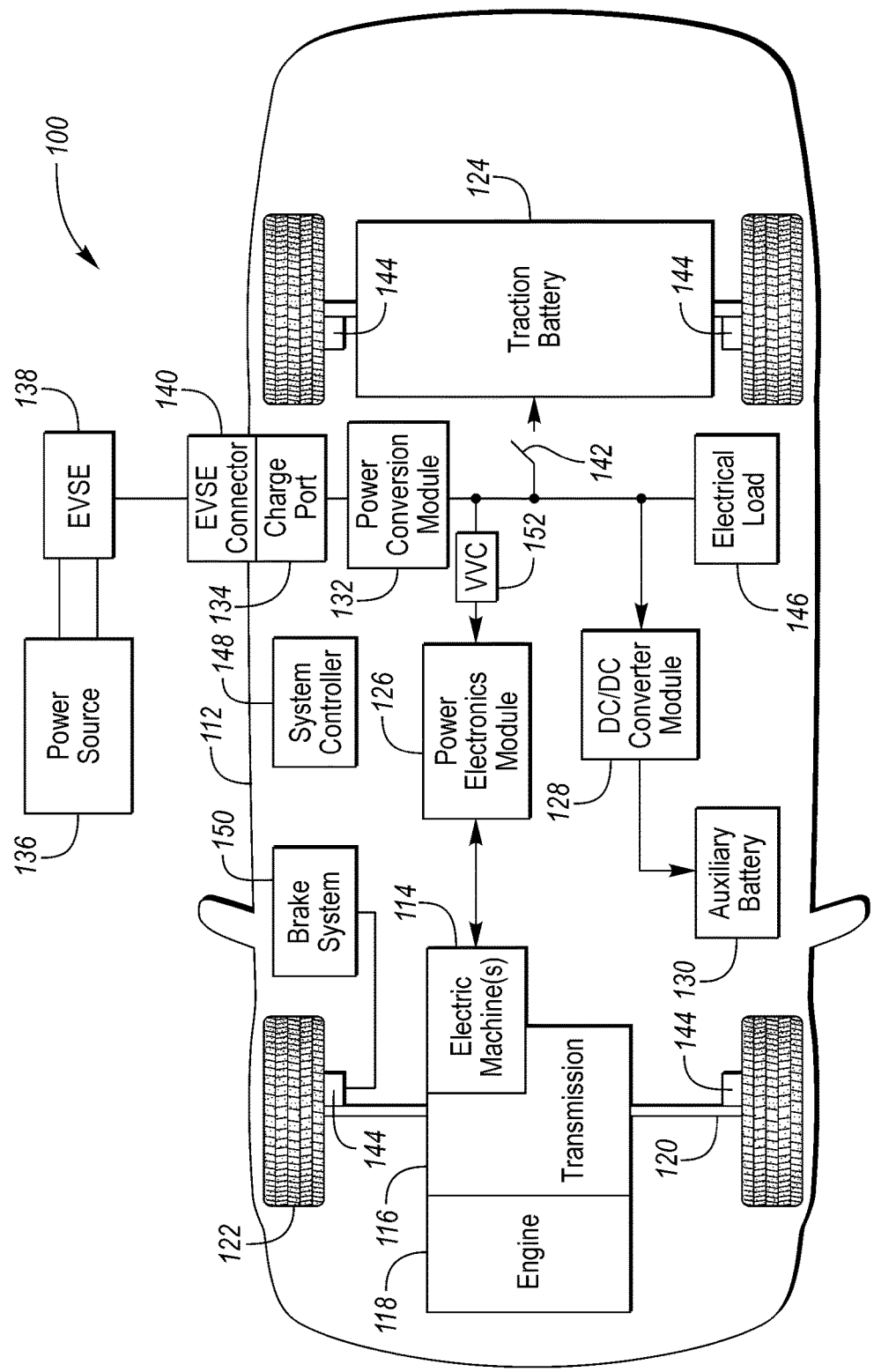
FIG. 2 is a diagram of a hybrid vehicle illustrating typical drivetrain and energy storage components including a variable voltage variable frequency converter.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel to the traction battery 124. The input capacitor may reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
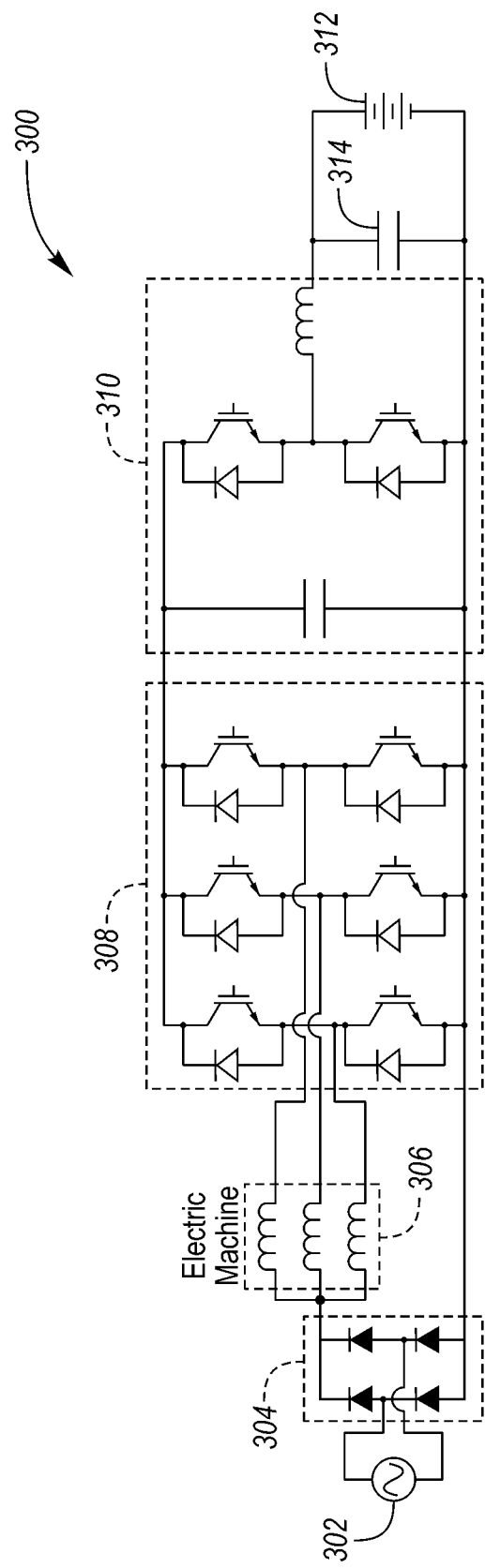
FIG. 3 is a schematic diagram of an electrified powertrain configured as an integrated charger.

FIG. 3 is a schematic diagram of an electrified powertrain 300 with an integrated charger. An alternating current (AC) source 302 is rectified by a bridge rectifier 304 to convert the AC power to rectified (AC) power. The rectified AC power then flows through the windings of the electric machine via a neutral terminal of a "Y-wound" electric machine 306. The machine's stator windings and inverter switches are used to create a three-phase interleaved power factor correction (PFC) converter. The windings of an electric machine 306 are used as a coupled inductor and the inverter switches are controlled to regulate the grid current to achieve unity power factor at the input AC side. The Direct Current (DC) link capacitor between the inverter 308 and DC-DC converter is used as an energy storage capacitor for supplying power to the batter during the zero crossing of the input ac voltage. After which the power passes through a DC/DC converter 310 (e.g., a buck/boost converter) that is then filtered via a storage capacitor 314, and stored in the battery 312. In this system, both the positive and negative terminals and buses are not isolated such that the high voltage bus has a conductive path to the phase and neutral connections of the AC grid.

The earth fault, caused by insulation loss between an energized conductor and vehicle chassis, introduces a concern for people using the vehicle. Plug-in electric vehicles (PEVs) are designed to operate worldwide. Regulations for earthing systems vary considerably among different countries. It is of paramount importance to design the vehicle to operate reliably and safely in the environment of different earthing systems. The International Electrotechnical Commission (IEC) cover a wide range of technologies including the electrical installations for buildings, published in the IEC 60364. The IEC 60364 standard defines the installation and implementation of the three earthing systems: TT, TN and IT. This disclosure provides solutions to reduce the impact of ground faults as it pertains to the vehicle implementation.

Connection to the utility grid is mainly intended to supply power to connected loads. In the case of an electric vehicle, the utility AC source 302 connects to a power processing conversion system 300 to charge a battery 312. Although the battery 312 is, in this context, a load, it also can be a source of energy while charging when encountering a ground fault situation.

Single phase voltage is supplied at different voltage levels and implemented by various means. The utility grid provides power in the form of single phase by providing two wires which carry the alternating current to consumer loads. Despite the disparity of grounding systems, single phase is provided by two means referred to as one-phase power and double-supply/split-phase power. The difference between these two methods is realized by the type of connection to the substation transformer. In the case of one phase system, one of the two power lines is used to supply the loads with one phase wire and the other wire is connected to the neutral. In the case of double/split phase power, both power lines, supplied by the utility, are phase wires while the Neutral wire is not used to carry the load current. The single-phase system is often adopted due to its flexibility. It allows low power loads to be powered by one phase power system while large power loads to be powered by double/split phase power system. In the United States 120 Volt which is supplied by one phase power system is used to power low power loads such as TVs, lights, refrigerator, etc. High power loads such as water heaters, AC compressors, etc. are powered by 240 Volt power circuits, which are supplied by double/split phase power; By taking two 120 V phases that are 180 degrees phase shifted from each other, the double/Split phase is created and customers are provided with 240 V.

Regarding loads, plug-in electric vehicles (PEVs) are new to the market and can be easily integrated to the existing AC utility grid. Original vehicle manufacturers (OEMs) design their vehicles to work under universal input AC voltages. In order to make use of the existing low voltage public distribution systems, vehicles should be able to charge with both the one phase and double/split phase configurations. The J1772 standard includes recommended practice for AC level 1 and AC level 2 charge levels as well as the conductive charge coupler and electrical interfaces. The J1772 and other similar standards consider the AC input as a voltage source by defining its voltage level and its connection to the vehicle. However, they do not account for either the grid type or its coupling configuration to the sub-station's transformer.

In the vehicle, modules that enclose energized parts of voltage class B electric circuit are housed in conductive cases. It is mandated by international standards and good judgment to conductively connect these cases to the vehicle chassis. ISO 6469 part 3 requires the resistance between two exposed conductive parts of the voltage class B electric circuit, which could be touched by a person, to be less than 0.1Ω. Thus, protection against exposure to significantly different potentials during a fault condition is always maintained by equipotential bonding, resulting in a system that is potentially equalized. Furthermore, the conductors forming the potential equalization shall withstand the maximum current in a single failure situation.

To quantify the impact of a ground fault, a model for an ideal non-isolated charger may be used for analysis. The charger model represents operation at unity input power factor. This model is applicable under an assumption that the charger remains stable under the fault condition (e.g., the charger ideally perform power conversion between its connected terminals). A generalized model is created by two dependent current sources. The input current source models the charger's ac input current while operating at unity power factor. The output current source models the charger's output current while charging a battery with a defined open circuit voltage.

Figure 4:
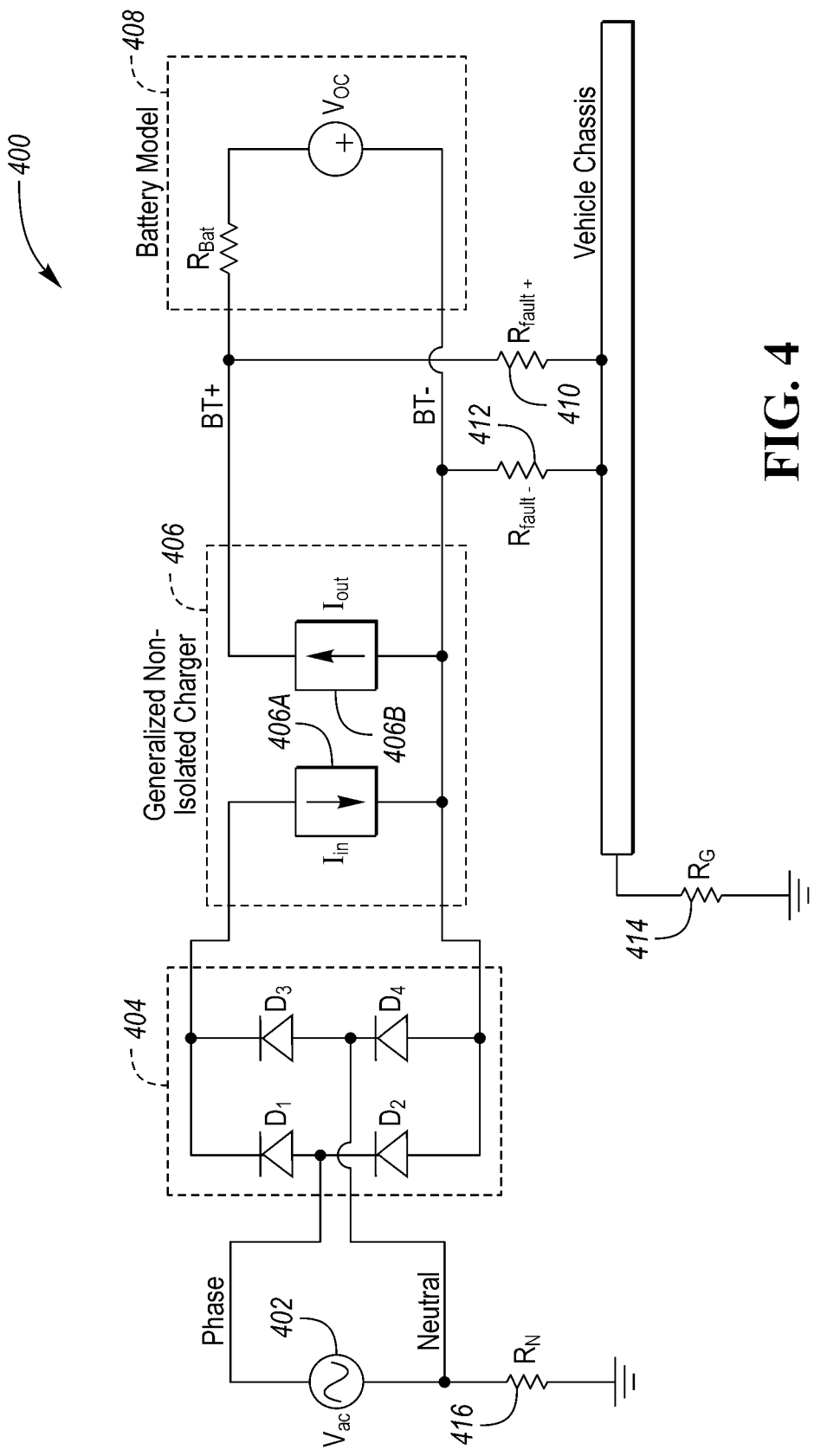
FIG. 4 is a schematic diagram of an electrified powertrain configured as an integrated charger coupled with a TT grounding system illustrating a ground fault.

FIG. 4 is a schematic diagram of an electrified powertrain 400 with an integrated charger coupled with a TT grounding system illustrating a ground fault. An alternating current (AC) source 402 is rectified by a bridge rectifier 404 to convert the AC power to direct current (DC) power. The bridge rectifier 404 has 4 diodes, D1, D2, D3, and D4. The DC power then flows through a generalized non-isolated charger 406 having an input element 406A and an output element 406B. Here, element 406 represents the windings of an electric machine 306, the inverter 308, and DC/DC converter 310. The output element 406B is coupled with the battery model 408. Illustrated in this schematic diagram 400 are a positive bus fault resistance ($R_{fault+}$) 410 to chassis and a negative bus fault resistance ($R_{fault-}$) 412 to chassis. The vehicle chassis has a chassis ground resistance ($R_G$) 414 and a neutral resistance to ground ($R_N$) 416.

The model shown in FIG. 4 does not account for losses in the charger. Hence, it is assumed that the output power at from element 406B is equal to the input power to element 406A averaged over one AC-line cycle. The emulated resistance across element 406A is the input AC resistance seen by the AC-grid may be represented by equation (1).

$$R_e = \frac{V_{ac(grid)}^2 (RMS)}{P_{out}} \qquad (1)$$

Based on an assumption that the charger operates at unity input power factor, the input current to the charger may be represented by equation (2).

$$I_{in} = \frac{|V_{ac(grid)}|}{R_e} \qquad (2)$$

And the charger's output current at from element 406B is the DC current delivered to the load (battery 408 that may be represented by equation (3).

$$I_{out} = \frac{P_{out}}{V_{CD}} \qquad (3)$$

A generalized model for a non-isolated charger can be created by yoking element 406A and element 406B. A first order battery model 408 is created by a voltage source representing the open circuit voltage of the battery for a specific state-of-charger operation. Additionally, the internal resistance of the battery is depicted by $R_{Bat}$, which is a series resistor in the path of the battery current. The voltage across element 406B is the voltage developed at the dependent current source due to the current flow to the battery. The voltage developed across $R_{Bat}$ directly corresponds to the amount of power delivered to the battery. FIG. 4 shows a non-isolated charger connected to the AC grid 402 via a full-bridge diode rectifier 404 with the output of the non-isolated charger connected to the battery 408.

The voltage across the AC source 402 terminals named "phase" and "neutral" (i.e., Vac) is the utility AC voltage. It is assumed that this voltage is sinusoidal. It is also assumed in this model that the input current is sensed by measuring the current flowing through the terminal named "phase". The charger is controlled such that the input current is in-phase with the input voltage as controlled by the charger switches which are modulated. The nature (characteristics and waveforms) of the ground fault current depends on the control strategy and sensor placement. In one embodiment, a voltage sensor is placed at the output of the full-bridge rectifier and is used to measure the differential voltage of the rectifier's output voltage. In another embodiment, the voltage sensor is placed at the input of the charger and is used to measure the AC source voltage. Along with use of voltage sensor to measure voltage, the concepts may use a current sensor to measure current. The detection of a fault may be accomplished via either current or voltage. For example, in one embodiment, a current sensor is placed at the input of the full bridge rectifier. If the current sensor is placed at the node connecting diode D1 and D2, then a fault between the positive bus terminal and ground can be detected using the proposed method. Similarly, if the current sensor is placed between the node connecting the diode D3 and D4, then a fault between the negative bus terminal and ground can be detected. Also, the power factor converter's controller may be designed to control the sensed phase current to follow a sinusoidal voltage reference with magnitude adjusted according to the AC voltage source magnitude and the emulated resistance Re. And, the reference current may be controlled to be in phase with the measured AC source voltage.

In order to clarify the stated assumptions, a well-known Power Factor Correction (PFC) boost rectifier circuit 404 is considered as an example. The output of the boost rectifier 404 is connected to a large energy storage capacitor. This energy storage capacitor balances the power difference between the input and output ports of the charger. This allows the charger to output constant power while its input is alternating power. Since this capacitor does not consume any real power, the average input AC-power is equal to the output power during steady-state operation. Hence, the input and output ports of the charger may be decoupled because the input port is mainly controlled to regulate the input current to be in-phase with the input voltage, and its amplitude depends on the resistor Re, given in equation (1), which is determined by the rms AC input voltage and output power.

The choice of the grounding system has a major influence on the safety and electromagnetic compatibility of power supplies. The magnitude and flow of fault currents in a system are unique to the type of the earthing system. Circulation of current through the earth does not occur in all fault conditions. Faults that energize an exposed conductive part create a potential difference between this exposed conductive part and the earth, thus causing a latent shock hazard if this exposed conductive part is touched. Protective equipotential bonding and automatic disconnection in case of a fault are required for circuits connected to the utility grid per the IEC 60364 standard. A protective conductor shall be available for each electric circuit. The connection of this protective conductor is connected differently in each earthing system. In this section, a detailed model for each earthing system shall illustrate the connection of the protective conductor as it pertains to vehicles. Furthermore, quantification of the ground fault current in each earthing system is provided.

FIG. 4 illustrates a TT earthing system that is typically used when the electric utility cannot make available safe and reliable means of earthing for their users. Countries that use the TT system may include Algeria, United Arab Emirates, Belgium, Denmark, Egypt, France, Greece, Italy, Japan, Kenya, Luxemburg, Morocco, Tunisia, Spain, Portugal and Turkey. In the TT system, the supply system is solidly grounded by a rod with resistance $R_N$ 416. The neutral line is carried to provide power to single-phase loads. Consumer ground is connected locally via a ground electrode, independent of the utility earthling system, with resistance $R_G$ 414.

According to the SAE J1772 standard, the vehicle chassis is directly connected to earth ground. In the TT grounding system, there is no protection conductor directly connecting the vehicle chassis to the utility neutral line. Hence, the magnitude of the fault current may be limited by the impedances of the earth soil, the rod connecting the vehicle chassis to earth ($R_G$) 414, and the rod connecting the supply neutral to earth ($R_N$) 416. The earth soil impedance is lumped with the rod resistances $R_N$ and $R_G$.

Figure 6:
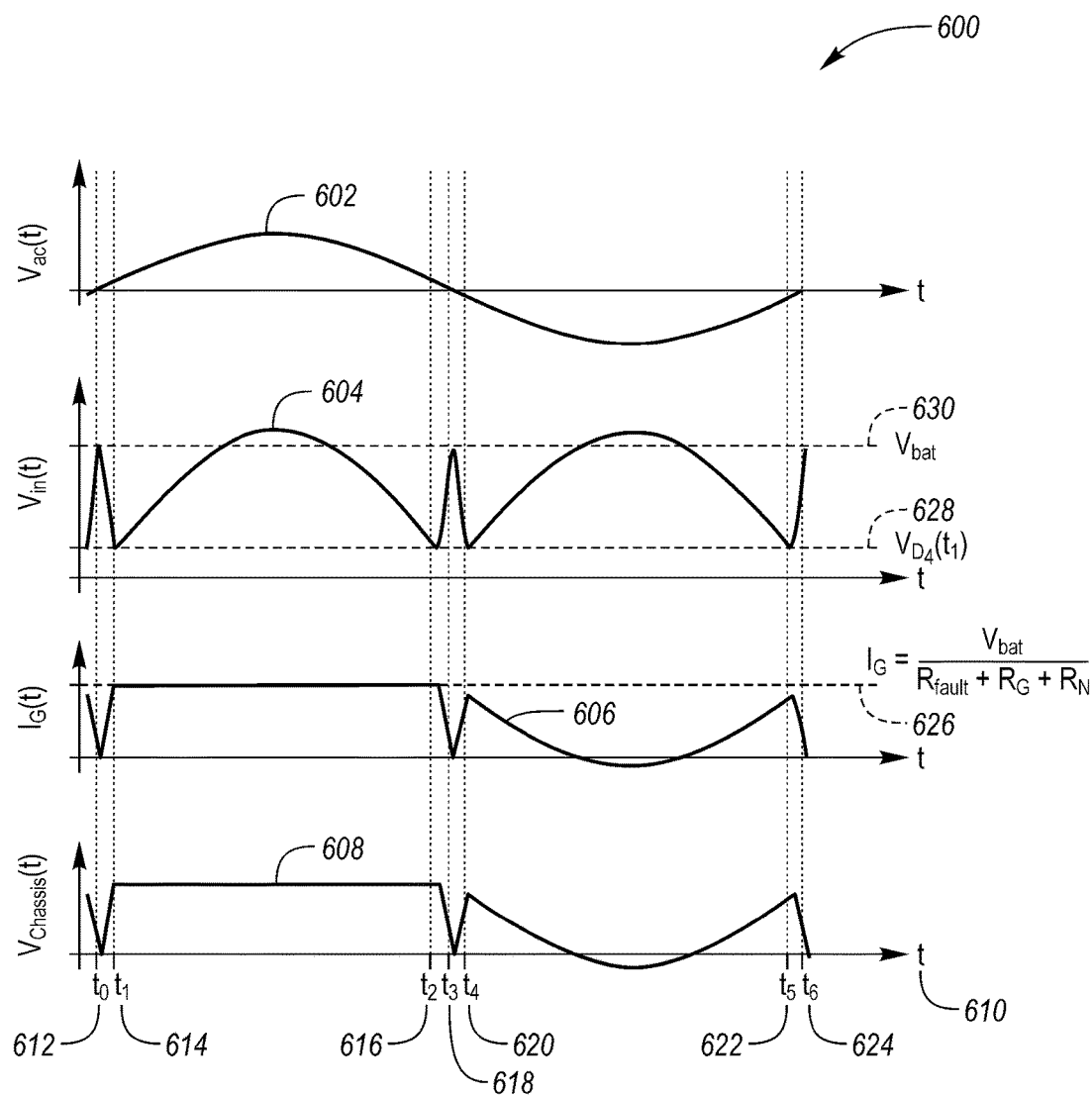
FIG. 6 is a graphical illustration electrical characteristics of a battery positive terminal to chassis fault in TT system with respect to time.

In the scenario when a fault is incurred between the positive battery terminal (BT+) and the vehicle chassis via a resistance $R_{fault+}$ 410. The resistance $R_{fault+}$ 410 between BT+ and vehicle chassis is lowered. It is assumed that prior to the fault occurrence the non-isolated charger is connected to the electric utility, via a full-bridge rectifier. Additionally, the non-isolated charger is charging the vehicle battery pack with a constant current. The charger's output voltage is maintained by the battery pack's output voltage. Due to the low resistance between BT+ and vehicle chassis, a fault current shall circulate through the earth ground. FIG. 4 also illustrates a fault incurred between the negative battery terminal (BT−) and the vehicle chassis via the resistance $R_{fault−}$ 412. Referring back to the positive fault current, the flow of a fault current between the positive battery terminal (BT+) and the vehicle chassis through the resistance $R_{fault+}$ 410 with respect to time is illustrated in FIG. 6.

Figure 5:
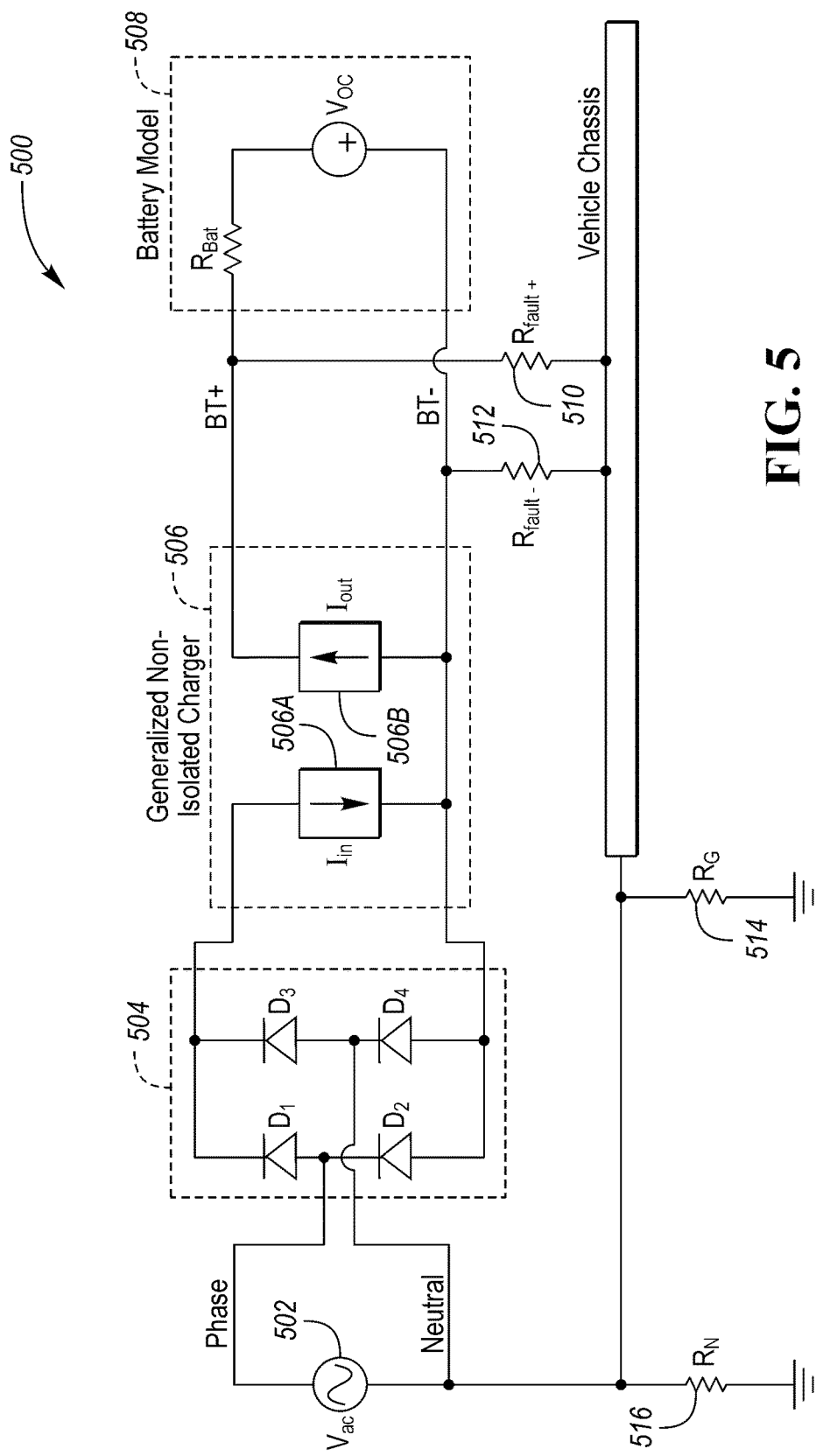
FIG. 5 is a schematic diagram of an electrified powertrain configured as an integrated charger coupled with a TN grounding system illustrating a ground fault.

FIG. 5 is a schematic diagram of an electrified powertrain 500 with an integrated charger coupled with a TN grounding system illustrating a ground fault. An alternating current (AC) source 502 is rectified by a bridge rectifier 504 to convert the AC power to direct current (DC) power. The bridge rectifier 504 has 4 diodes, D1, D2, D3, and D4. The DC power then flows through a generalized non-isolated charger 506 having an input element 506A and an output element 506B. The output element 506B is coupled with the battery model 508. Illustrated in this schematic diagram 500 are a positive bus fault resistance ($R_{fault+}$) 510 to chassis and a negative bus fault resistance ($R_{fault−}$) 512 to chassis. As this is a TN grounding system, the vehicle chassis is directly coupled with neutral line of the AC source 502. The vehicle chassis has a chassis ground resistance ($R_G$) 514 and a neutral resistance to ground ($R_N$) 516.

Industrial facilities that operate front-end substations may employ a TN grounding system, even if the outside earthing system is TT. In this example, the local utility supplies the facility with medium to high voltage tension. The substation may have a transformer to stepdown the supplied voltage to low voltage levels suitable for the consumer. Typically, the primary side is wound as delta and the secondary side is wound as a wye. The neutral of the secondary side (wye connected winding) is solidly grounded. All exposed conductive parts are connected to this neutral point via protective conductors. The protective conductor is designed to withstand the fault current. Additionally, the neutral connection is carried to supply power to single phase loads.

There are multiple ways to implement a TN grounding system, for example a TN-S in which the neutral is carried to supply current for the single-phase loads, a TN-C in which the neutral and protective conductor wires are combined in a single cable, and a TN-C-S in which the neutral and protective conductor are combined in a single cable only in parts of the system but separated in different parts. Also, a separate protective conductor is carried to handle fault currents. Unlink the TT system, the fault current circulates through the protective conductor, and it will not circulate through the earth.

The protective multiple system (e.g., TN-C-S) is the grounding system that will be used to describe a ground fault in a vehicle connected to any type of TN network (e.g., TN-C, TN-S, TN-C-S). The point of contact between the vehicle and the supply system is through the electric vehicle supply equipment (EVSE), which is defined in SAE J1772.

Countries that use the TN-C-S system include U.S.A., Australia, U.K., Canada, China, Germany, South Africa, Sweden, and Switzerland. Single phase voltage is supplied in different voltage levels (120V/240V) and implemented by various means: one phase power and double/split phase power. The neutral line of the supply system is solidly grounded by a rod with resistance $R_N$. The Neutral line is carried to supply power to single-phase loads. Consumer ground is connected locally via a ground electrode, independent of the utility earthling system, with resistance $R_G$.

For the one-phase power implementation, the TN system has similar performance as the TT network with the exception of a higher fault current, as such this application will focus on the TT system however the concepts disclosed are applicable to both TT and TN systems. As the fault current in a TN system is no longer limited by the earth's soil resistance. The results for the BT+ to chassis and BT− to chassis faults for the same operating condition applied in the TT grounding system earlier apply to the TN system. Then, by setting $R_N$ and $R_G$ to zero, the analytical equations derived earlier for the TT network is equivalent to the TN network. Since the PE conductor has high conductivity relative to the earth's soil, it is expected that majority of the ground fault current to not circulate through the earth ground.

FIG. 6 is a graphical illustration of electrical characteristics 600 of a battery positive terminal to chassis fault in TT system with respect to time 610. An electric utility supply voltage (Vac) 602, input voltage to the non-isolated charger (Vin) 604, current flowing through $R_G$ ($I_G$) 606, and vehicle chassis voltage ($V_{chassis}$) 608 are shown with respect to time 610. It can be realized that the fault current in the positive ac line cycle is different from the fault current in the negative ac line cycle.

To gain insight into the characteristics of the fault current, the waveforms shown in FIG. 6 is divided into six intervals. Each inverter may be described by an equivalent circuit as described based on FIG. 4 for the positive ac line cycle and negative ac line cycle, respectively.

The first interval (State 1) is at time greater than or equal to ($t_0$) 612 and less than ($t_1$) 614. The ground fault current is equal to the charger's input current because D1 of rectifier 404 is the only diode conducting and the charger is actively controlling its current to emulate the resistor Re. Here, $R_e$ is an emulated resistance of input stage of the converter to compensate for phase shifting to maintain unity power factor correction. The ground current can be derived from FIG. 6 (a) and is given by equation 4.

$$I_G = \frac{V_{ac}(t)}{R_e} \quad (4)$$

State 1 ends once D4 conducts. The voltage across D4 may be represented by equation 5

$$V_{D4} = -\frac{R_{fault} + R_G + R_N}{R_e} V_{ac}(t) + V_{bat} \quad (5)$$

The second interval (State 2) is at time greater than or equal to ($t_1$) 614 and less than ($t_2$) 616. Diode D4 of rectifier 404 starts conducting at time t1 614. The charger's input voltage is fixed by the supplied electric utility voltage. Current flowing through D1 of rectifier 404 is sinusoidal and controlled by the charger such that unity input power factor is maintained. Therefore, the ground fault current may be represented by equation 6.

$$I_G = \frac{V_{bat}}{R_{fault} + R_G + R_N} \quad (6)$$

It can be shown that during this second interval, the ground fault current does not depend on the supplied ac voltage but depends only on the battery voltage and fault impedance. Current flowing through the phase wire returns to the supply via two paths: the soil and supplied neutral wire. Therefore, it is expected that the current flowing through D1 of the rectifier 404 is higher than the current flowing through D4 of rectifier 404. The current flowing through D4 is negatively biased by the ground current and may be represented by equation 7.

$$I_{D4} = I_{phase} - I_G \quad (7)$$

The third interval (State 3) is at time greater than or equal to ($t_2$) 616 and less than ($t_3$) 618. As the current flowing through D4 of rectifier 404 is negatively biased by the ground current, D4 reverses bias before D1 of rectifier 404. This results in the circuit becoming similar to state 1 until the electric utility voltage transitions negative. The input voltage to the non-isolated charger may be represented by equation 8.

$$V_{in} = V_{ac}(t)\left[1 - \frac{R_{fault} + R_G + R_N}{R_e}\right] + V_{bat} \quad (8)$$

The fourth interval (State 4) is at time greater than or equal to ($t_3$) 618 and less than ($t_4$) 620. State 4 starts once the electric utility voltage becomes negative. First, D3 of rectifier 404 conducts then shortly, at time t4 620, D2 of rectifier 404 conducts. Current flowing through D3 is equal to the ground fault current which is also the input current to the charger. The ground fault current and input voltages may be represented by equation 9 and equation 10, respectively. State 4 ends once D2 of rectifier 404 begins conducting at time t4 620. The voltage across D2 may be represented by equation 11 and the time t4 602 may be determined by equation 12.

$$V_{in} = V_{bat} - I_G(t)[R_{fault} + R_G + R_N] \quad (9)$$

$$I_G = I_{in}(t) \quad (10)$$

$$V_{D2}(t) = V_{ac}(t) + V_{bat} - I_G(t)[R_{fault} + R_G + R_N] \quad (11)$$

$$t_4 = \frac{1}{\omega}\left[\sin^{-1}\left(\frac{V_{bat}}{\sqrt{2}\,V_{ac(rms)}\left[\frac{R_{fault} + R_G + R_N}{R_e} - 1\right]}\right) + \pi\right] \quad (12)$$

The point in time of the zero crossing of the AC source (e.g., the point at which the potential of the AC source transitions from positive to negative) is time ($t_3$) 618. Here it is desired to measure characteristics such as Vin 604 or Diode voltages of the rectifier at this point in time, ($t_3$) 618. However, the measurement may be made during a window or time surrounding the zero crossing ($t_3$) 618, for example, the measurement may begin at a time greater than ($t_2$) 616 and less than ($t_4$) 620. Another aspect is the magnitude of the measurement, as illustrated in FIG. 6 at time ($t_3$) 618, Vin 604 spikes greater than $V_{D4}$ 628 as represented by equation 5, but less than Vbat 630. In one embodiment, a lower threshold of a magnitude of the voltage is $V_{D4}$ 628. In another embodiment, the lower threshold of the magnitude of the voltage may be a percentage of $V_{bat}$ 630, for example, ½, 1, 2, 3, or 5% of $V_{bat}$ 630.

The fifth interval (State 5) is at time greater than or equal to ($t_4$) 620 and less than ($t_5$) 622. Once the voltage across D2 of rectifier 404 becomes zero, it begins to conduct. The charger's input voltage is then fixed by the electric utility grid voltage. The Battery voltage reduces the ground current and the ground fault current over this interval may be represented by equation 13.

$$I_G = \frac{V_{bat} + V_{ac}(t)}{R_{fault} + R_G + R_N} \quad (13)$$

The sixth interval (State 6) is at time greater than or equal to ($t_5$) 622 and less than ($t_6$) 624. As the current flowing through D2 of rectifier 404 is negatively biased by the ground current, D2 will reverse bias before D3. The reverse biasing causes the circuit to operate similar to state 4 until the electric utility voltage becomes positive.

Figure 7:
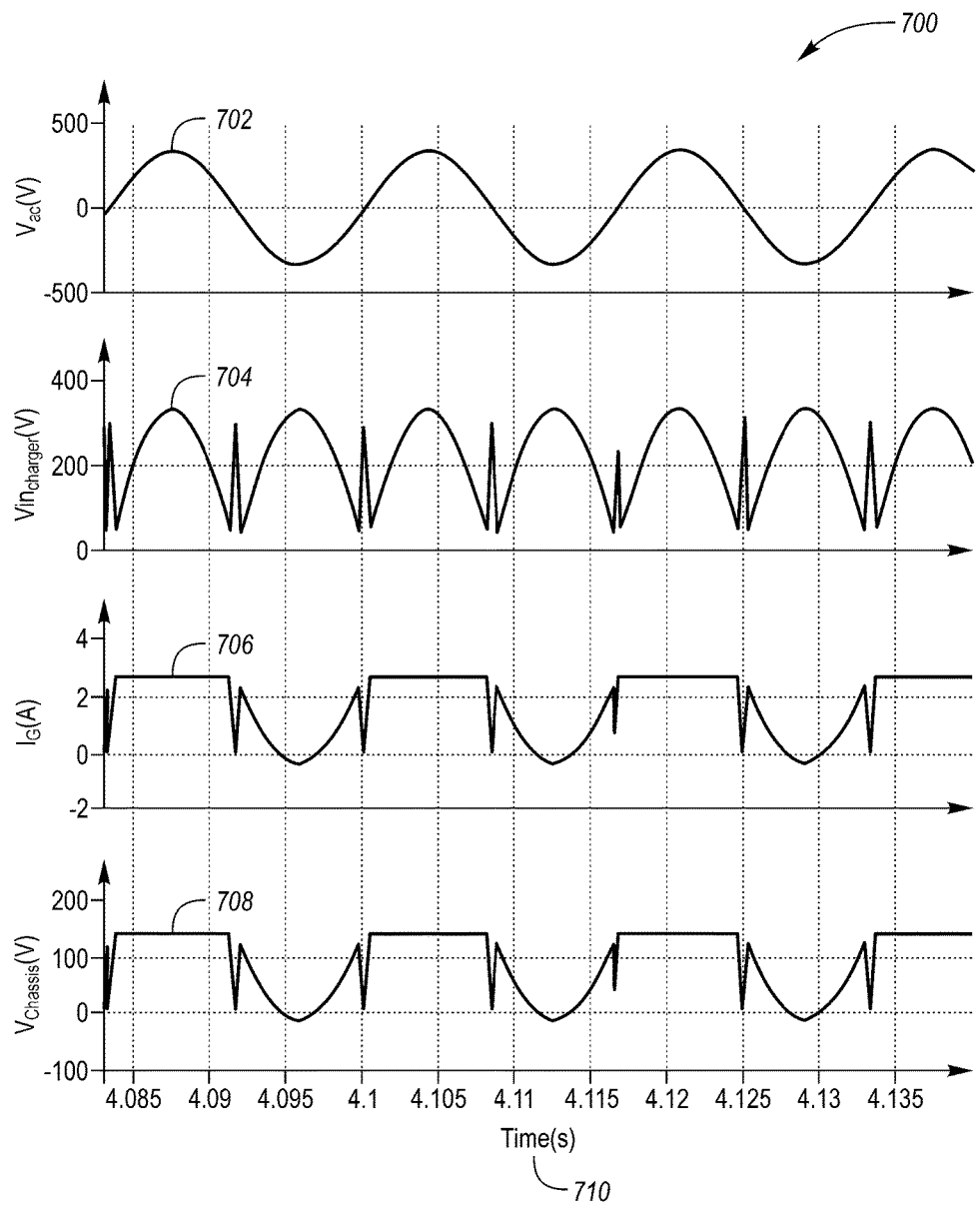
FIG. 7 is a graphical illustration electrical characteristics of a battery positive terminal to chassis fault in TT system with respect to time.

FIG. 7 is a graphical illustration electrical characteristics 700 of a battery positive terminal to chassis fault in TT system with respect to time 710. An electric utility supply voltage (Vac) 702, input voltage to the non-isolated charger (Vin) 704, current flowing through $R_G$ ($I_G$) 706, and vehicle chassis voltage ($V_{chassis}$) 708 are shown with respect to time 710. It can be realized that the fault current in the positive ac line cycle is different from the fault current in the negative ac line cycle. Here the peaks are shown at least at times 4.1 sec and at 4.125 secs.

Consider the case when a supply AC voltage of 240 V is provided, with an output power of 3.3 kW, and a battery voltage of 300 V. In which $R_N$ and $R_G$ are approximately 10Ω and 50Ω, respectively. A fault between BT+ and the vehicle chassis is created by introducing a 50Ω resistor there between. FIG. 7 illustrates the waveforms depicting the results. Notice that during the zero crossing of the AC line voltage, the input voltage to the charger increases to be approximately equal to the battery voltage. That is because, during this point in time, only one diode is conducting. A conclusion is that this fault condition may cause the vehicle chassis voltage to reach a high potential in which measurement at this point may be indicative of a ground fault.

Figure 8:
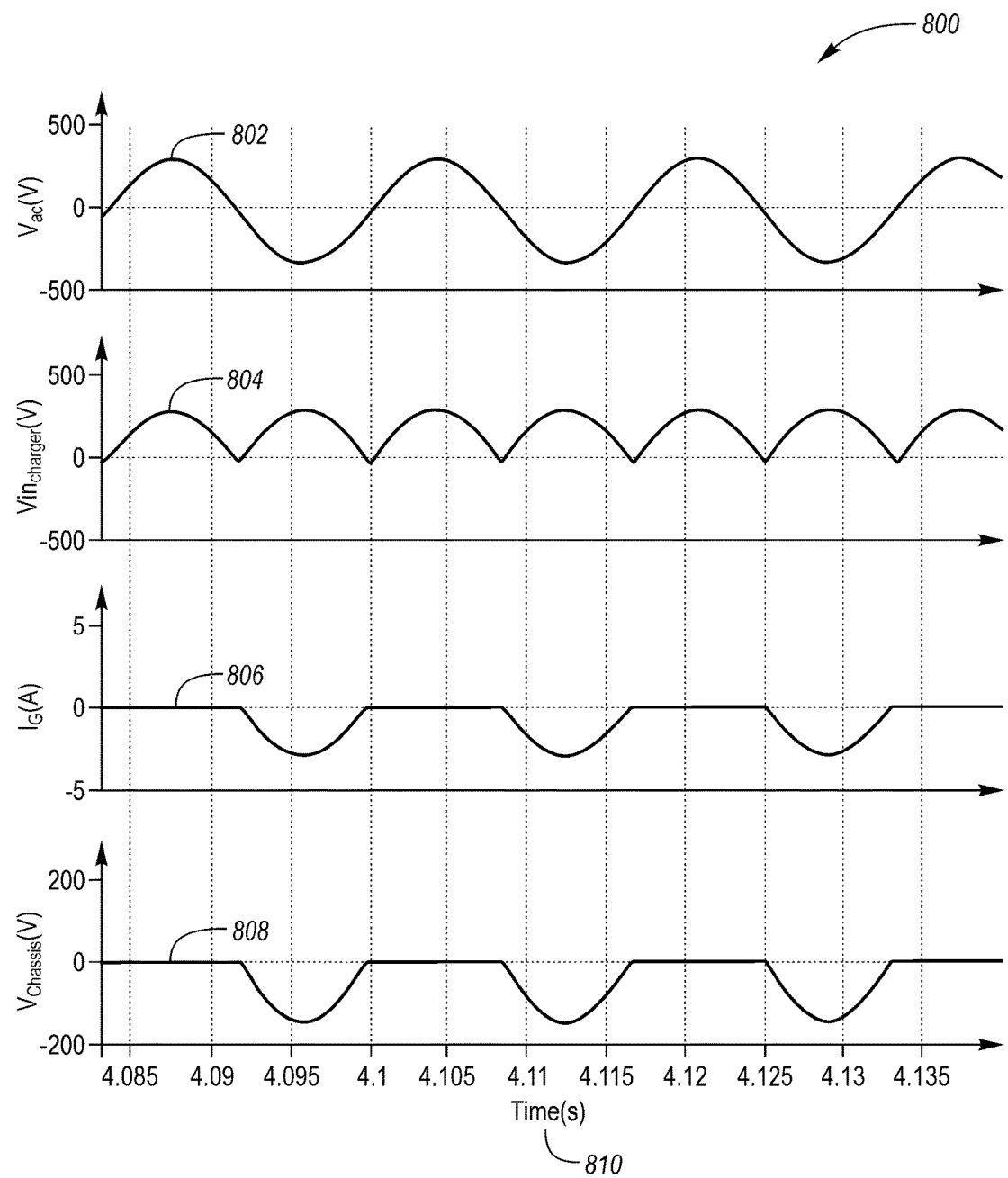
FIG. 8 is a graphical illustration electrical characteristics of a battery negative terminal to chassis fault in TT system with respect to time.

FIG. 8 is a graphical illustration electrical characteristics of a battery negative terminal to chassis fault in TT system with respect to time. An electric utility supply voltage (Vac) 802, input voltage to the non-isolated charger (Vin) 804, current flowing through $R_G$ ($I_G$) 806, and vehicle chassis voltage ($V_{chassis}$) 808 are shown with respect to time 810.

FIG. 8 illustrates a fault between the negative battery terminal (BT−) and the vehicle chassis. The resistance between BT− and vehicle chassis is $R_{fault−}$. Prior to the fault, the non-isolated charger has been coupled to the electric utility via a full-bridge rectifier that supplies a pure sinusoidal AC voltage. The non-isolated charger is charging the vehicle battery pack with a constant current. The charger's output voltage is maintained by the battery pack's output voltage. FIG. 8 illustrates the ground fault current due to low resistance between BT− and vehicle chassis.

Figure 9:
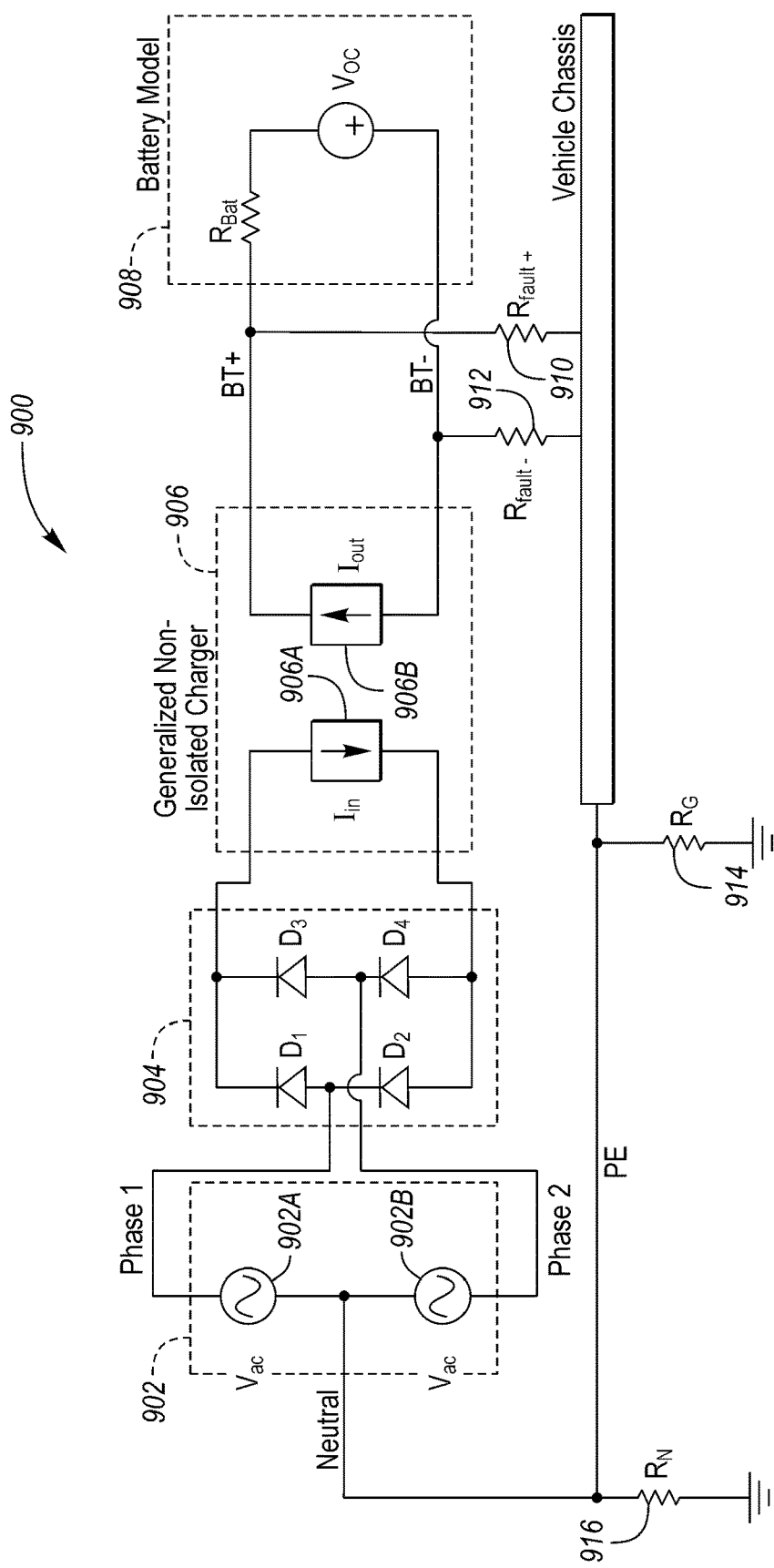
FIG. 9 is a schematic diagram of an electrified powertrain configured as an integrated charger coupled with a split phase TN grounding system illustrating a ground fault.

FIG. 9 is a schematic diagram of an electrified powertrain 900 with an integrated charger coupled with a split phase TN grounding system illustrating a ground fault. An alternating current (AC) source 902, including a first AC source 902A and a second AC source 902B coupled in series and having a center neutral tap, is rectified by a bridge rectifier 904 to convert the AC power to direct current (DC) power. The bridge rectifier 904 has 4 diodes, D1, D2, D3, and D4. The DC power then flows through a generalized non-isolated charger 906 having an input element 906A and an output element 906B. The output element 906B is coupled with the battery model 908. Illustrated in this schematic diagram 900 are a positive bus fault resistance ($R_{fault+}$) 910 to chassis and a negative bus fault resistance ($R_{fault−}$) 912 to chassis. As this is a TN grounding system, the vehicle chassis is directly coupled with neutral line of the AC source 902. The vehicle chassis has a chassis ground resistance ($R_G$) 914 and a neutral resistance to ground ($R_N$) 916. Ground fault current in the double/split phase power implementation is different than the one phase power implementation. However, both can be broken up into six states to illustrate operation which is illustrated in FIG. 10.

Figure 10:
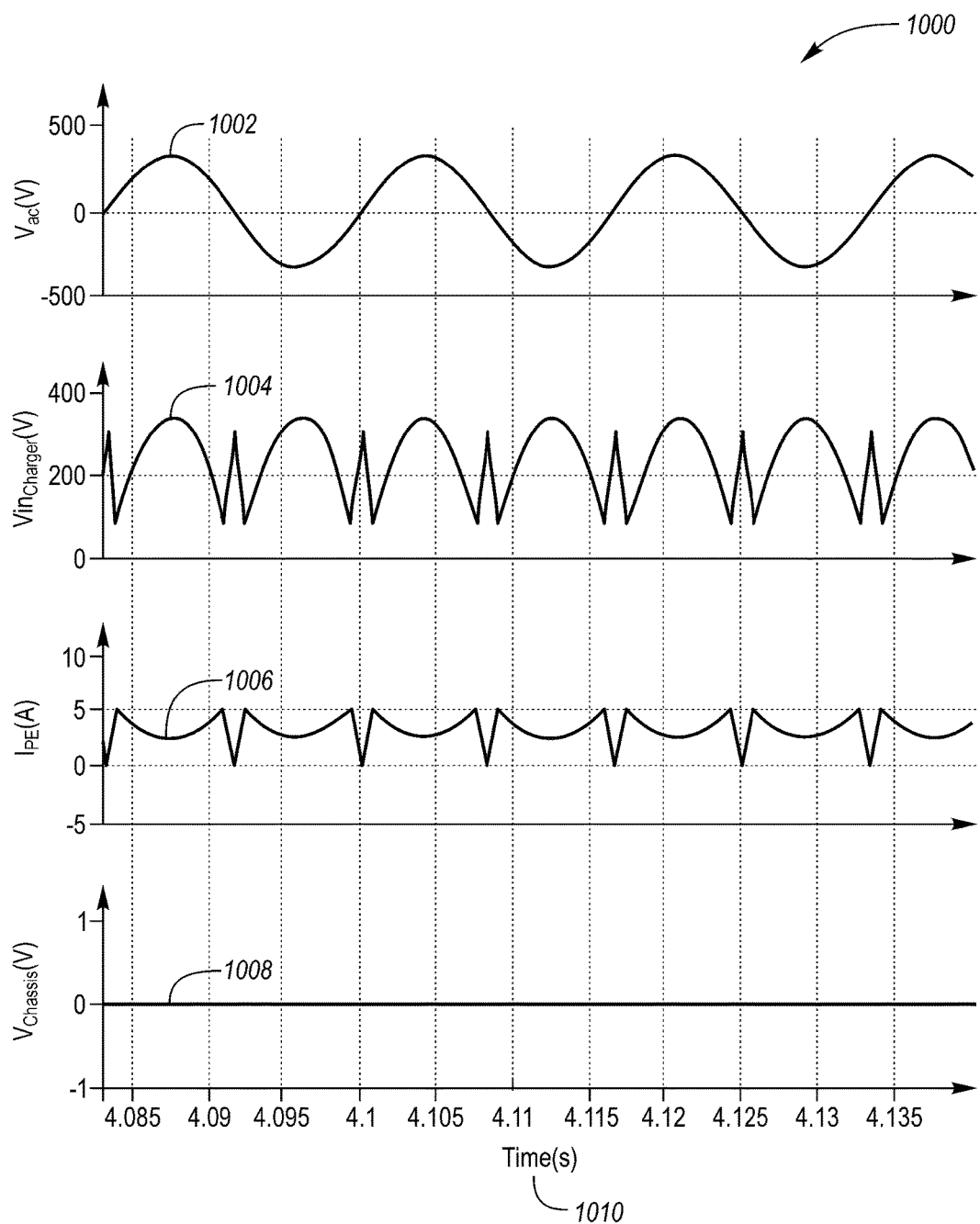
FIG. 10 is a graphical illustration electrical characteristics of a battery positive terminal to chassis fault in a split phase TN system with respect to time.

FIG. 10 is a graphical illustration of electrical characteristics of a battery positive terminal to chassis fault in a split phase TN system 1000 with respect to time 1010. An electric utility supply voltage (Vac) 1002, input voltage to the non-isolated charger (Vin) 1004, current flowing through $R_G$ ($I_G$) 1006, and vehicle chassis voltage ($V_{chassis}$) 1008 are shown with respect to time 1010. Using the timing of FIG. 6 as reference, The first interval (State 1) is at time greater than or equal to ($t_0$) and less than ($t_1$). In the positive AC line cycle, the fault current causes D1 and D4 to not conduct at the same time. D1 conducts first once the electric grid voltage turns positive. Shortly after D4 conducts, after its voltage drops to zero. State 1 ends once D4 conducts. The ground fault current is equal to the charger's input current because D1 is the only diode conducting and the charger is actively controlling its current to emulate the resistor Re.

The second interval (State 2) is at time greater than or equal to ($t_1$) and less than ($t_2$). D4 starts conducting at t1. The charger's input voltage is fixed by the supplied electric utility voltage. Current flowing through D1 is sinusoidal and controlled by the charger such that unity input power factor is realized. Due to the conduction of D4, the ground current is clamped at a constant value. The magnitude of the ground current depends on the battery voltage and the fault loop impedance. Current flowing through the phase wire returns to the supply via two paths, i) the protective conductor and ii) the supplied phase wire. Hence, the current flowing through D1 is higher than the current flowing through D4. Current flowing through D4 is negatively biased by the ground current.

The third interval (State 3) is at time greater than or equal to ($t_2$) and less than ($t_3$). As the current flowing through D4 is negatively biased by the ground current, D4 will reverse bias before D1, causing the circuit to become the same as state 1 until the electric utility voltage becomes negative.

In States 4 to 6, unlike the one phase power implementation, states 4 to 6, occurring during the negative line cycle, are identical to state 1 to 3, occurring in the positive line cycle.

Galvanic isolation is not a mandate in the industry. For both isolated and non-isolated chargers, a vehicle chassis must be connected to grid ground if the on-board voltage class B circuit is conductively connected to the grid. Suppression of CM noise is critical for non-isolated chargers; standards for designing the control pilot circuit and maximum Y-cap value possess challenges for non-isolated chargers. An isolation monitoring circuit for non-isolated chargers must be compatible with the various existing EVSE isolation monitoring technologies. Fault protection for non-isolated chargers is achieved by potential equalization, per ISO 6469.3. Hence, the development of new ground fault detection systems is necessary for non-isolated chargers.

In the TT grounding system, a distinctive difference in ground fault current waveform between faults occurring at the HV positive terminal to chassis and HV negative terminal to chassis. Ground current in the scenario of HV positive terminal to chassis fault is dependent on the input supply voltage, the fault loop impedance, the power delivered to the loads and the battery voltage. Ground current in the scenario of HV negative terminal to chassis fault is dependent only on the input supply voltage and the fault loop impedance.

In the TN network, ground fault current is expected to be larger than the ground fault current in the TT network. The TN network provides better protection against indirect contact than the TT network during a HV fault. While the implementation of the substation and house grounding influence the vehicle chassis voltage during HV ground fault in the TT network, they have no influence on the chassis voltage in the TN network. Since the protective conductor has relatively high conductivity and in parallel with the earth resistance, the vehicle chassis voltage is expected to never reach a hazardous voltage levels in the TN network.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle charger comprising:
a diode bridge configured to rectify an alternating current (AC) source;
contactors coupling the AC source with a traction battery; and
a controller configured to open the contactors responsive to a magnitude of a potential at an output of the diode bridge, corresponding to a zero crossing of a potential of the AC source, exceeding a threshold that is greater than a defined set point determined by minimum allowed impedance between a positive high voltage DC bus and ground.

2. The electrified vehicle charger of claim 1 further including a voltage sensor coupled across the output of the diode bridge and configured to output the magnitude.

3. The electrified vehicle charger of claim 1, wherein the zero crossing includes a window of time prior to and after a point in time at which the potential of the AC source transitions between positive and negative.

4. The electrified vehicle charger of claim 3, wherein the window of time is a percentage of a line period of the AC source.

5. The electrified vehicle charger of claim 4, wherein the percentage of a line period is determined according to a minimum AC voltage source magnitude, a minimum emulated resistance, and a threshold fault resistance.

6. The electrified vehicle charger of claim 1 further including a current sensor coupled between the AC source and the diode bridge and configured to output a signal indicative of the magnitude.

7. The electrified vehicle charger of claim 1, wherein the threshold is greater than zero and less than an instantaneous high voltage DC bus differential voltage.

8. The electrified vehicle charger of claim 1, wherein the AC source is a single-phase AC source or a split-phase AC source configured as a TT grounding network.

9. A method of operating a vehicle charger comprising:
by a controller, disabling the charger responsive to a voltage across a diode of a rectifier for an alternating current (AC) source exceeding a threshold as a potential of the AC source changes sign, wherein the threshold is greater than a defined set point determined by minimum allowed impedance between a positive high voltage DC bus and ground.

10. The method of claim 9, wherein disabling the charger includes disconnecting contactors between a traction battery and the AC source.

11. The method of claim 9, wherein an anode of the diode is coupled with a phase terminal of the AC source or a neutral terminal of the AC source.

12. The method of claim 9, wherein the AC source is a single-phase AC source or a split-phase AC source of a TT network.

13. An electrified vehicle charger comprising:
a diode bridge configured to rectify an alternating current (AC) source, and including a first diode with an anode coupled to a phase terminal of the AC source and a second diode with a cathode coupled to a neutral terminal of the AC source; and
a controller programmed to, responsive to the first diode conducting and the second diode not conducting at a zero crossing of the AC source, disable the charger.

14. The electrified vehicle charger of claim 13, wherein the first diode conducting is defined by current greater than a threshold flowing through the first diode and the second diode not conducting is defined by current less than the threshold flowing through the second diode.

15. The electrified vehicle charger of claim 13, wherein a forward voltage applied to the first diode is indicative of the first diode conducting, and a reverse voltage applied to the second diode is indicative of the second diode not conducting.

16. The electrified vehicle charger of claim 13, wherein the AC source is a single-phase AC source or a split-phase AC source.

17. The electrified vehicle charger of claim 13, wherein the AC source is configured as a TT grounding network.

18. The electrified vehicle charger of claim 13, wherein disabling the charger includes disconnecting contactors between a traction battery and the AC source.

* * * * *